March 25, 1930. M. F. WATERS 1,752,215
OIL AND GAS SEPARATOR
Filed April 9, 1928 2 Sheets-Sheet 1

INVENTOR.
M. F. Waters.
BY
George A. Prevost
ATTORNEY.

March 25, 1930.  M. F. WATERS  1,752,

OIL AND GAS SEPARATOR

Filed April 9, 1928   2 Sheets-Sheet

INVENTOR.
M. F. Waters,
BY George A. Prevost
ATTORNEY.

Patented Mar. 25, 1930

1,752,215

UNITED STATES PATENT OFFICE

MILLARD F. WATERS, OF TULSA, OKLAHOMA, ASSIGNOR TO SMITH SEPARATOR COMPANY, OF TULSA, OKLAHOMA

OIL AND GAS SEPARATOR

Application filed April 9, 1928. Serial No. 268,748.

My invention consists in new and useful improvements in oil and gas separators of the type employed to separate gas from oil immediately after a mixture of oil and gas is discharged from the well.

In the handling of liquids and gases, it is common knowledge, particularly with oil and gas, that if the liquid and gas are broken up into fine streams, these elements will liberate themselves from each other, and to this end I have provided a novel baffle arrangement designed to give more surface contact to the gas, thereby breaking it up and freeing it of any liquids or solids which may be entrained therewith.

As a further object of my invention, I provide a rotary baffle adapted to be revolved by the action of the incoming mixture of oil and gas, said baffle being in the form of a perforated spiral.

With the above and other objects in view which will appear as the description proceeds, my invention consists in the novel features herein set forth, illustrated in the accompanying drawings, and more particularly pointed out in the appended claims.

Referring to the drawings, in which numerals of like character designate similar parts throughout the several views—

Figure 6:
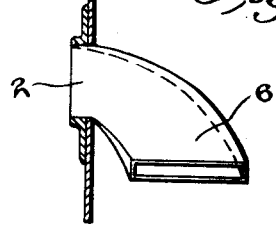
Fig. 6 is a detail view of the inlet snout.

In the drawings, 1 represents an oil and gas separator tank, provided with a plurality of oil and gas inlets 2, located in the walls of the tank slightly above the center thereof, a gas outlet 3, in the upper portion of the tank, an oil outlet 4 in the wall of the tank, near the lower extremity thereof, and a sand drain 5, connected into the bottom of the tank. At each of the inlets 2, I provide snouts 6, which extend inwardly, downwardly and angularly with respect to the walls of said tank, and flared outwardly at their lowermost ends, as clearly shown in Figs. 1 and 6.

In that portion of the tank immediately beneath the inlet snouts 6, I provide a baffle member 7, which comprises a cylinder 8, vertically disposed with respect to said tank, and spaced apart from the walls thereof, said cylinder being open at both ends and secured by any suitable means to a rotary hollow shaft 9, centrally mounted in said tank, in suitable bearings 10, secured in place by supports 11 at the upper and lower ends of said shaft. Within the cylinder 8, and secured to the inner walls thereof, is a spiral baffle 12, which extends from the upper to the lower extremity of said cylinder, around said hollow shaft 9.

Figure 1:
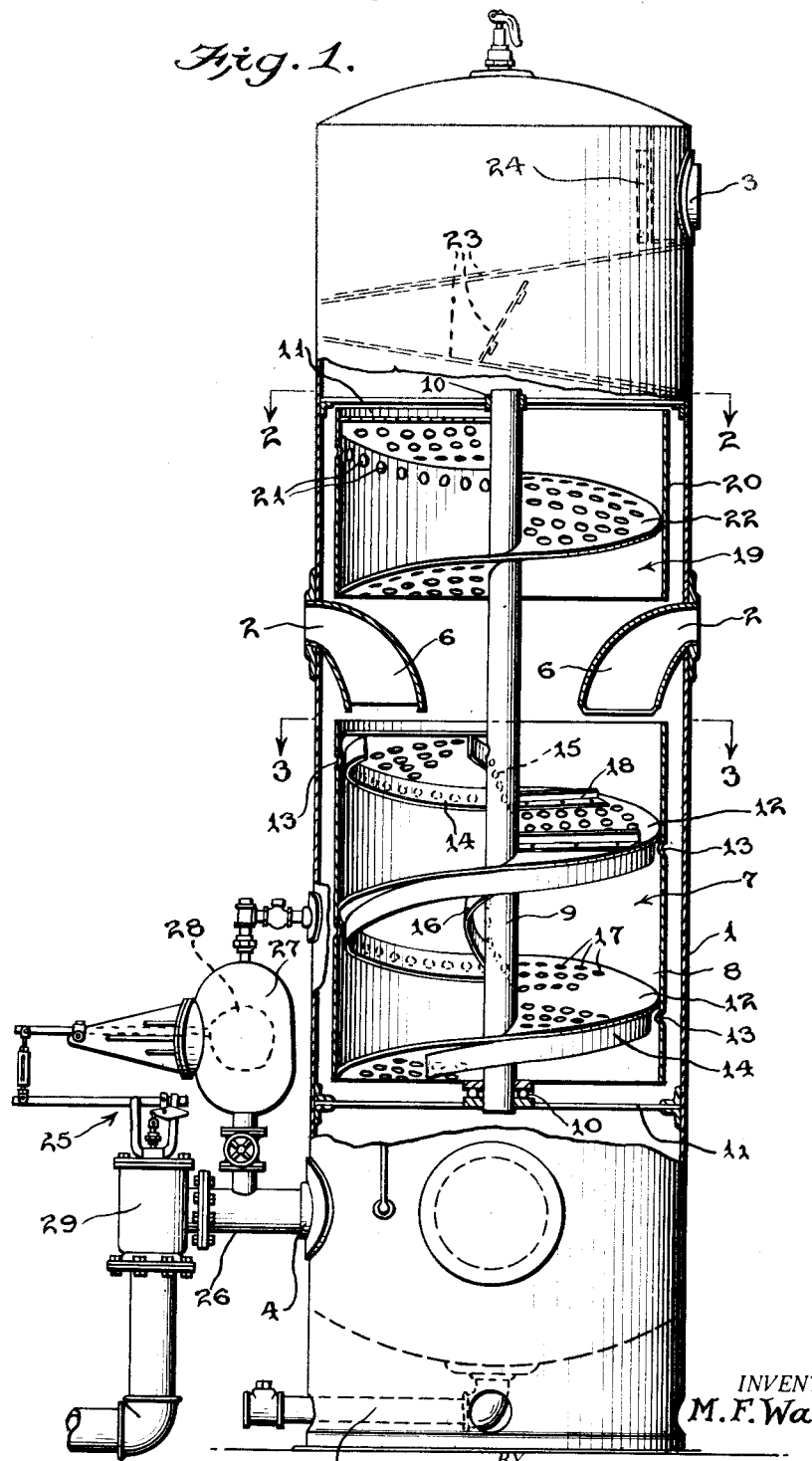
Fig. 1 is a view of a separator tank in side elevation, partly broken away to show the baffle arrangement.
Figure 2:
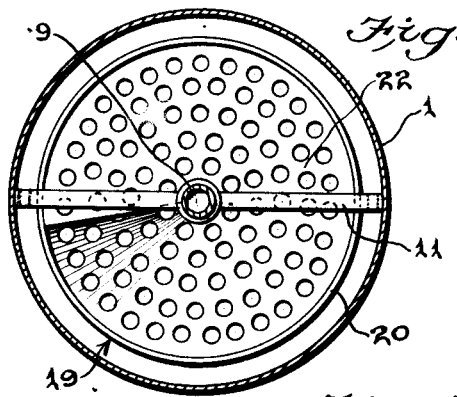
Fig. 2 is a sectional view taken on line 2—2 of Fig. 1, showing the upper spiral baffle.
Figure 4:
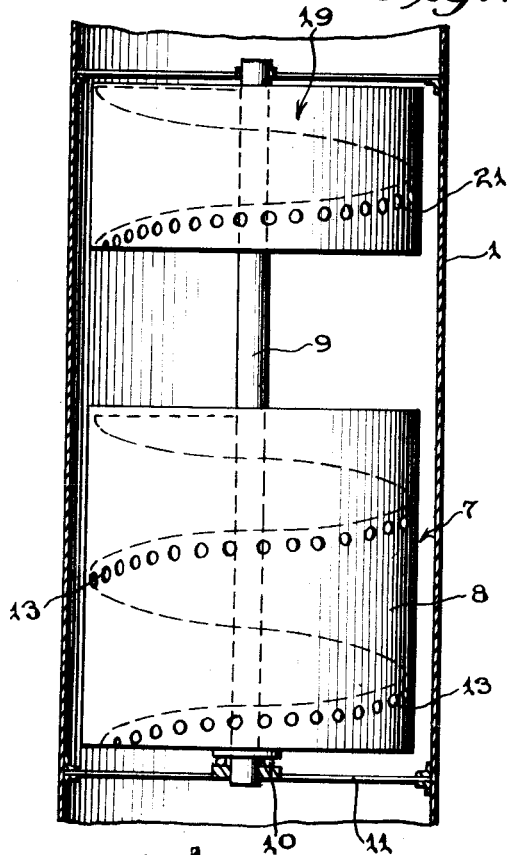
Fig. 4 is a sectional view of a portion of the separator tank, showing the baffle cylinders in side elevation.
Figure 5:
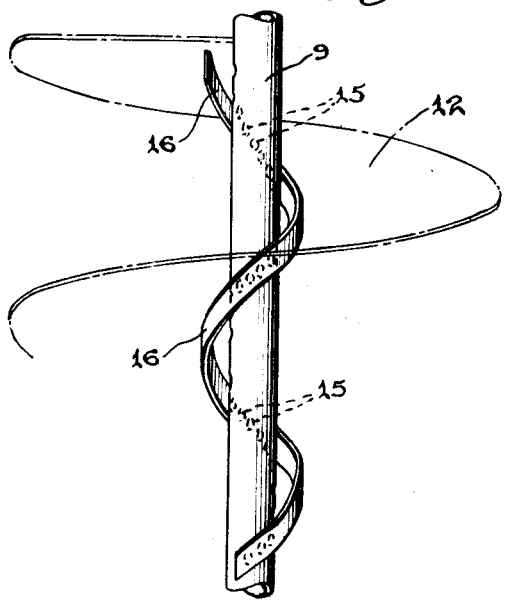
Fig. 5 is a detail view of the central tubular shaft and inner baffle skirt, showing the location of the spiral baffle in dotted lines.

As will be seen from Figs. 1 and 4 of the drawings, the wall of the cylinder 8 is provided with a series of apertures 13, arranged spirally adjacent the lower edge of the spiral baffle 12, and extending from the top to the bottom of said cylinder. 14 represents a depending skirt secured to the under face of the baffle 12, and located adjacent the series of spiral apertures 13, said skirt being slightly spaced apart from said apertures and the walls of said cylinder 8, for the purpose hereinafter set forth.

Likewise, the hollow shaft 9 is provided with a spiral series of apertures 15, adjacent the inner edge of the spiral baffle 12, where it is secured to said shaft, and an inner skirt 16, similar to the skirt 14, is provided adjacent said apertures 15, on the under surface of the baffle 12, and slightly spaced apart from the said shaft.

Figure 3:
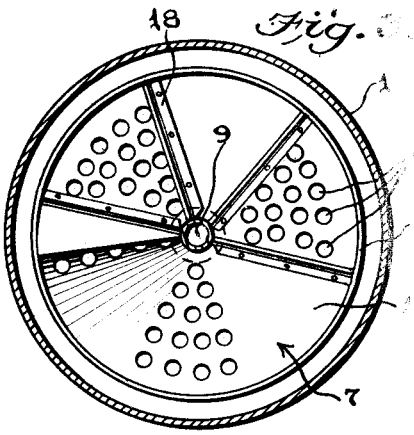
Fig. 3 is a sectional view taken on line 3—3 of Fig. 1, showing the lower spiral baffle.

As will be seen from Figs. 1 and 3, the baffle 12 is perforated at predetermined points throughout its length, said perforations being arranged in groups, alternating with imperforate areas, whereby the groups of perforations and imperforate areas are in staggered relation as the spiral descends. In other words, immediately beneath a perforated portion, I provide an imperforate area, and vice versa.

Figure 7:
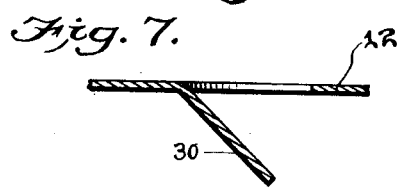
Fig. 7 is an enlarged detail of a section of the spiral baffle showing the form of aperture employed.

These perforations are preferably of the type shown in Fig. 7, having their centers only partially punched out, and left depending therefrom at a downward angle, forming lips 30, for the purpose hereinafter set forth.

On the upper face of that portion of the spiral baffle 12, immediately adjacent the inlet snouts 6, I provide a series of angle irons or vanes 18, projecting upwardly from said baffle, and disposed transversely thereon (see Figs. 1 and 3).

In the upper portion of the tank 1, immediately above the inlet snouts 6, I provide a second baffle member 19, consisting of a cylinder or drum 20, secured to the upper end of the shaft 9, and provided with a series of spirally arranged apertures 21. This cylinder 20 is also vertically disposed with respect to said tank, and spaced apart from the walls thereof, being similar in all respects to the lower cylinder 8, with the exception of the length of its walls, as will be seen from Figs. 1 and 4 of the drawings. Within this cylinder 20, and secured to the shaft 9, I provide a spiral baffle 22, which, unlike the spiral baffle 12, in the lower cylinder, is perforated throughout its entire area, and is not equipped with depending skirts at its inner and outer edges.

Immediately above the rotary baffle member 19, I provide suitable stationary baffles 23, shown in dotted lines in Fig. 1, which may be of any type desired. 24 represents a gas outlet baffle secured to the inner wall of the tank 1, adjacent the outlet 3, which also may be of any desired type.

In the lower portion of the tank 1, connected into the oil outlet 4, I provide an automatic outlet control 25, of the type shown and described in my co-pending application Serial No. 4,933, filed Jan. 26, 1925.

Having thus described in detail the construction of my apparatus, the operation is as follows.

The mixture of oil and gas enters the tank 1 at the inlets 2, and is deflected downwardly in a spiral direction by the snouts 6, from whence it comes in contact immediately with the upper surface of the spiral baffle 12. As the mixture strikes the vanes 18 on the upper portion of the spiral baffle 12, the cylinder 8, together with the enclosed baffle, will be caused to rotate, due to the weight of the fluid and the force with which it is introduced into the tank. The projecting lips 30 of the perforations in the spiral baffle 12, will serve as additional propelling means against which the inflowing liquid impinges, to rotate the baffle.

The free gas will immediately rise to the upper portion of the tank, and come in contact with the spiral baffle 22 in the upper cylinder 20, which, being mounted on the same shaft 9, will also be caused to rotate with the spiral 12. As the gas passes through the perforations in the spiral baffle 22, the rotation of said baffle will give the gas continuous contact, and practically all of the entrained liquid will be knocked back to the lower extremity of the separator, any gas which may have passed upwardly between the cylinder 20 and the tank 1, being separated from its liquid content by the additional baffles 23 and 24 in the upper portion of the tank, thus permitting only clean gas to leave the tank at the outlet 3.

The liquid and entrained gases having entered the lower chamber 8, and coming in contact with the spiral baffle 12, flows downward. The liquid is immediately broken up into small streams as it passes through the perforated portions 17 of said baffle, and as it continues to pass downwardly, it is further broken up due to the staggered arrangement of the perforated and imperforate areas of the baffle 12.

As the baffle member 7 rotates, the heavier portions of the liquid are thrown outwardly by centrifugal force against the inner walls of the chamber 8, which allows the accumulation of gas around the tubular shaft 9. As before stated, this shaft 9 is provided with a series of spirally arranged apertures 15, which are protected from the inflow of liquid, by the skirt baffle 16, whereby the gas may enter the tubular shaft and be conducted away from the liquid through said shaft to the upper portion of the tank 1, where it is further deprived of any liquid content by the baffle arrangement in the upper portion of the tank.

Likewise, as the liquid falls through the perforations in the spiral baffle 12, some of the same will vaporize, and rise between the outer skirt baffle 14, and the inside wall of the chamber 8, and it is to allow the escape of this gas and prevent it from coming in contact with the downflowing liquid, that said outer skirt baffle 14 is provided. The gas then leaves the lower cylinder or chamber 8, through the spirally arranged apertures 13, and proceeds upwardly between the outside of the cylinder and the inside of the separator tank 1, from whence it goes directly to the upper end of the tank, or enters the upper cylinder 20 for further separation. Any condensate of this gas between the skirt 14 and the cylinder 8, will drop by gravity to the bottom of the tank.

The height of the liquid accumulating in the lower portion of the tank 1, is controlled by the automatic outlet control 25. The liquid enters the flow nipple 26, and gradually rises in the float chamber 27, causing the upward movement of the float 28, which, when the liquid has arrived at a predetermined level, opens a valve 29, to allow the escape of the separated liquid.

While I have shown and described a rotary baffle arrangement, it is obvious that the same structure may be employed as a stationary unit, and while I have described the upper cylinder 20 as similar to the lower cylinder 8, with the exception of its length, it will be noted that these cylinders may be of the same length or the upper cylinder longer than the lower cylinder, if desired. Or, a larger number of cylinders and baffle members may be employed.

From the foregoing, it is believed that the construction, operation and advantages of my invention may be readily understood by those skilled in the art, and I am aware that changes may be made in the details disclosed, without departing from the spirit of the invention, as expressed in the following claims.

What I claim and desire to secure by Letters Patent is:

1. In an oil and gas separator tank, a vertically disposed hollow shaft rotatably mounted therein, a cylinder mounted on said shaft and rotatable about the axis thereof, a spiral baffle within said cylinder and around said shaft, said shaft and cylinder being provided with a series of spirally arranged apertures in its wall, adjacent the under side of said spiral baffle, and depending skirts secured to the under surface of said baffle adjacent said spirally arranged apertures, and spaced apart therefrom.

2. Apparatus as claimed in claim 1, wherein said spiral baffle is alternately provided with perforated and imperforate areas.

3. Apparatus as claimed in claim 1, wherein said spiral baffle is alternately provided with perforated and imperforate areas arranged in staggered relation vertically.

4. An oil and gas separator comprising a tank, oil and gas inlets in the wall of said tank, a vertical shaft rotatably mounted in said tank, cylinders mounted on said shaft and rotatable therewith above and below said inlets, each of said cylinders having a perforated spiral baffle secured therein around said shaft, means whereby said cylinders and baffles may be rotated by the force of the incoming oil and gas.

5. An oil and gas separator as claimed in claim 4, wherein said tank is provided adjacent said inlets with downwardly and angularly disposed snouts.

6. An oil and gas separator as claimed in claim 4, wherein the lower spiral baffle is equipped with vanes, and said tank is provided adjacent said inlets with downwardly and angularly disposed snouts, arranged immediately above said vanes, whereby the incoming oil and gas will cause said baffles and cylinders to rotate and break up the particles of oil and gas.

7. In an oil and gas separator tank, a baffle member comprising a rotatably mounted cylinder having a perforated spiral baffle secured within the walls thereof and about its axis of rotation, said perforations having depending lips against which down-flowing liquid is directed, whereby said cylinder is rotated.

8. In an oil and gas separator tank, a baffle member comprising a rotatably mounted cylinder having a perforated spiral baffle secured within the walls thereof, and about its axis of rotation, the walls of said cylinder being provided with a series of spirally arranged perforations, the remaining area being imperforate, the convolutions of the spiral series of perforations being spaced apart a distance substantially equal to the distance between the convolutions of the spiral baffle.

9. In an oil and gas separator tank, a baffle member comprising a rotatably mounted cylinder having a perforated spiral baffle secured within the walls thereof, and about its axis of rotation, the walls of said cylinder being provided with a series of perforations arranged spirally therein, adjacent the lower outer edge of said spiral baffle, the area between the convolutions of said perforations being imperforate.

10. In an oil and gas separator tank, a baffle member comprising a rotatably mounted cylinder having a perforated spiral baffle secured within the walls thereof, and about its axis of rotation, said cylinder being mounted on a hollow rotary shaft vertically mounted in said tank, and to which the inner edge of said spiral baffle is secured, said shaft having a series of apertures spirally arranged in the wall thereof adjacent the lower inner edge of said spiral baffle, the remaining area being imperforate, the convolutions of the spiral series of perforations in said shaft being spaced apart a distance substantially equal to the distance between the convolutions of the spiral baffle.

11. In an oil and gas separator tank, a baffle member comprising a rotatably mounted cylinder having a perforated spiral baffle secured within the walls thereof, and about its axis of rotation, the walls of said cylinder being provided with a series of spirally arranged perforations, the remaining area being imperforate, the convolutions of the spiral series of perforations being spaced apart a distance substantially equal to the distance between the convolutions of the spiral baffle, said cylinder being mounted on a hollow rotary shaft vertically mounted in said tank, and to which the inner edge of said spiral baffle is secured, said shaft having a series of apertures spirally arranged in the wall thereof adjacent the lower inner edge of said spiral baffle, the convolutions of the spiral apertures in said shaft being spaced apart a distance substantially equal to the distance between the convolutions of the spiral baffle.

In testimony whereof I affix my signature.

MILLARD F. WATERS.